(12) United States Patent
Canete Cabeza et al.

(10) Patent No.: US 11,495,394 B2
(45) Date of Patent: Nov. 8, 2022

(54) COMPACT MAGNETIC POWER UNIT FOR A POWER ELECTRONICS SYSTEM

(71) Applicant: PREMO SA, Campanillas (ES)

(72) Inventors: Claudio Canete Cabeza, Benalmadena (ES); Antonio Rojas Cuevas, Malaga (ES); Francisco Ezequiel Navarro Perez, Barcelona (ES); Marina Arcos Perez, Malaga (ES); Patrick Fouassier, Saint Nazaire les Eymes (FR); Raquel Rodriguez, Estepona (ES)

( * ) Notice: Subject to any disclaimer, the term of this patent is extended or adjusted under 35 U.S.C. 154(b) by 585 days.

(21) Appl. No.: 16/347,442

(22) PCT Filed: Nov. 3, 2017

(86) PCT No.: PCT/EP2017/078203
§ 371 (c)(1),
(2) Date: May 3, 2019

(87) PCT Pub. No.: WO2018/083249
PCT Pub. Date: May 11, 2018

(65) Prior Publication Data
US 2019/0279812 A1 Sep. 12, 2019

(30) Foreign Application Priority Data

Nov. 4, 2016 (EP) .................................... 16002348
Nov. 7, 2016 (EP) .................................... 16002354

(51) Int. Cl.
*H01F 27/24* (2006.01)
*H01F 27/29* (2006.01)
(Continued)

(52) U.S. Cl.
CPC .............. *H01F 27/29* (2013.01); *H01F 1/12* (2013.01); *H01F 27/18* (2013.01); *H01F 27/22* (2013.01);
(Continued)

(58) Field of Classification Search
CPC . H01F 27/29; H01F 27/18; H01F 1/12; H01F 27/22; H01F 27/263;
(Continued)

(56) References Cited

U.S. PATENT DOCUMENTS 4,210,859 A * 7/1980 Meretsky ................ G11C 11/08
323/331
5,835,066 A * 11/1998 Kropielnicki ........ H01Q 1/1278
343/860
(Continued)

FOREIGN PATENT DOCUMENTS

DE 19814896 A1 7/1999
EP 0498897 B1 11/1995
(Continued)

*Primary Examiner* — Mang Tin Bik Lian
(74) *Attorney, Agent, or Firm* — Eugenio J. Torres-Oyola; Victor M. Rodriguez-Reyes; Rafael Rodriguez-Muriel (57) ABSTRACT

The magnetic poser unit (100) comprises a magnetic core (10) including a first, a second and a third winding channels (2a, 2b, 2c) respectively arranged around a first, a second and a third crossing axis (A-A, B-B, C-C) orthogonal to each other, each of said winding channels (2a, 2b, 2c) being intended for receiving one coil wound around the magnetic core (10), each coil having at least one turn. The crossing axis (A-A, B-B, C-C) define orthogonal planes providing eight octants, each including a protrusion defining a protruding spacer (20), being spaced to each other by said winding channels (2a, 2b, 2c). The magnetic core (10) is a composed core formed by several different partial magnetic cores assembled together including two side partial magnetic cores (12), each including four protruding spacers (20). The magnetic core (10) further includes a through hole (30) housing a device for heat dissipation (50).

16 Claims, 7 Drawing Sheets

(51) Int. Cl.
*H01F 1/12* (2006.01)
*H01F 27/22* (2006.01)
*H01F 27/26* (2006.01)
*H01Q 7/06* (2006.01)
*H01F 27/18* (2006.01)
*H01F 3/00* (2006.01)

(52) U.S. Cl.
CPC .............. *H01F 27/263* (2013.01); *H01Q 7/06* (2013.01); *H01F 2003/005* (2013.01)

(58) Field of Classification Search
CPC ........... H01F 2003/005; H01F 17/0033; H01F 17/04; H01F 2027/08; H01F 27/10; H01F 27/24; H01F 27/28; H01F 27/289; H01Q 7/06
See application file for complete search history.

(56) References Cited

U.S. PATENT DOCUMENTS

| | | | | |
|---|---|---|---|---|
| 6,239,681 | B1 * | 5/2001 | Buswell | H01F 3/06 29/602.1 |
| 6,777,835 | B1 | 8/2004 | Sines | |
| 7,042,411 | B2 * | 5/2006 | Yagi | H01Q 7/06 343/787 |
| 2004/0061660 | A1 * | 4/2004 | Yoshida | H01Q 7/06 343/788 |
| 2005/0151696 | A1 * | 7/2005 | Govari | H01Q 5/40 343/788 |
| 2006/0152427 | A1 * | 7/2006 | Ueda | H01Q 21/24 343/788 |
| 2007/0195001 | A1 * | 8/2007 | Ueda | H01Q 1/3233 343/788 |
| 2010/0304976 | A1 * | 12/2010 | Overweg | H01F 7/202 505/162 |
| 2011/0128204 | A1 * | 6/2011 | Murakami | H01Q 7/06 343/788 |
| 2013/0033408 | A1 * | 2/2013 | Miki | H01Q 25/00 343/788 |
| 2015/0155629 | A1 * | 6/2015 | Yagi | H01Q 7/00 343/788 |
| 2015/0310976 | A1 | 10/2015 | Tong et al. | |
| 2016/0078993 | A1 * | 3/2016 | Cedell | H01F 27/2876 336/61 |

FOREIGN PATENT DOCUMENTS

| | | |
|---|---|---|
| EP | 1315178 A1 | 5/2003 |
| EP | 1489683 A1 | 12/2004 |
| EP | 1526606 A1 | 4/2005 |

\* cited by examiner

COMPACT MAGNETIC POWER UNIT FOR A POWER ELECTRONICS SYSTEM

TECHNICAL FIELD

The present invention refers to a significantly reduced size integrated magnetic power unit comprising a magnetic core including a first, a second and a third winding channels respectively arranged around a first, a second and a third intersecting axis orthogonal to each other, at least two and in general the three of said winding channels receiving each at least one coil wound around the magnetic core each coil having at least one turn, and the magnetic power unit further comprising one device for heat dissipation of the core including a non-metallic thermally conductive element.

The proposed magnetic power unit has been specially designed for high frequency transformers for switched power electronics systems which implies the use of magnetic fields of frequency preferably comprised between 10 KHz and 1 MHz, where heat cannot be evacuated with electroconductive elements, since the losses would be greater than the heat evacuated.

This magnetic power unit is particularly adapted to be used for example as a transformer or inductor in the electrical power field, and conceived for operating a high power electrical device, especially usable in the field of hybrid and electrical vehicles (HEVs) that nowadays is growing quite fast. The new models of electrical vehicles require more and more power electronics inside, not only for the electrical motor supply with speed and torque control, but also for high-voltage (HV) battery chargers and stable in-car continuous low-voltage (LV) power supplies.

The magnetic power unit of this invention further responds to a new volumetric efficiency concept on magnetic units (highly compacity and better volumetric performance, mainly when a 3D magnetic flux is involved) with a magnetic core including around it several orthogonal windings for producing two or three substantially orthogonal magnetic fields at all point within the core It will be understood along this description that references to geometric position, such as parallel, perpendicular, tangent, etc. allow deviations up to ±5° from the theoretical position defined by this nomenclature. It will also be understood that any range of values given may not be optimal in extreme values and may require adaptations of the invention to these extreme values are applicable, such adaptations being within reach of a skilled person.

BACKGROUND OF THE INVENTION

U.S. Pat. No. 4,210,859 discloses an inductive device that may be utilized as an inductor or transformer in a variety of applications, comprising a magnetic core and orthogonal windings for producing two or three substantially orthogonal magnetic fields at all point within the core. FIGS. 16 and 17 of this patent document disclose embodiments for inductive device structures which accommodate several orthogonal windings on the same core. However, this disclosure, when detailing a triaxial inductive device does not solve at least two problems related to the construction of the core and to the self-heating of the inductor, when this is or is associated to a transformer, the last problem making the proposal practically unfeasible, mainly when operating under high power.

Different approaches have been attempted to try and remove heat (produced by the Foucault currents generated) from the core of magnetic power units particularly in the case of power transformers.

DE19814896 discloses a power transformer for high current having a closed cylindrical core of soft magnetic high permeability material high saturation induction and low magnetic losses. This is wound with a primary coil and a secondary coil. The core is within a casing that is then filled with a suitable resin. At least one insulated rod-shaped or tubular heat pipe (9) made of a metallic body container filled with a liquid for cooling the unit is set in the centre attached to the core. The heat pipe forms at least one part of the winding of the transformer.

EP0498897 (B1) reveals an electrical wiring material that can use as cooling means for heating portions in electronic apparatuses and a transformer having a coil of one side also serving as the cooling means. The document discloses a material for electrical wirings provided with a cooling function. The material is characterized in that it comprises a slender hollow conductor in which an operating liquid is sealed. Also, this EP patent relates to a transformer in which the material for electrical wirings is used for the coil on its low voltage side. Since the coil heated by the large current flowing through it dissipates the heat by itself, there is no necessity to provide other coiling means.

U.S. Pat. No. 6,777,835B1 discloses an electrical power cooling technique and particularly an apparatus for cooling a high power electrical transformer and electrical motors by using thermally conductive material interleaved between the turn layers of a high-power transformer and iron core laminates to provide a low resistant thermal path to ambient. In an embodiment heat is dissipated through the core to a base plate, while thermally conductive strips are placed in preselected positions between the windings and are preferably of high modulus graphite laminate material, to conduct heat along its fibre orientation, which is unidirectional. However, the thermally conductive material explained to evacuate the heat is a material that conducts electricity and that cannot work in high-frequency commuted magnetic fields since the heat induced in the graphite by magnetic induction losses or Eddy currents would be higher than the heat to be evacuated.

US20150310976 discloses a magnetic element comprising magnetic blocks (prismatic and without protrusions or channels) stacked together forming two parallel columns, and two magnetic plates connecting the ends of said columns creating a closed magnetic flux path which directs the magnetic flux generated by conductive coils wound around said columns in a direction perpendicular to the surfaces of each magnetic block which are facing other magnetic blocks. Each of the parallel columns includes a conductive wounded coil producing a magnetic field causing a self-heating of the magnetic blocks. A metallic heat conduction pipe is disposed through at least one column, producing a cooling effect by heat dissipation. As in the previous case the material used for the heat pipe is not compatible for a high-frequency commuted magnetic field.

While this document teaches how an arrangement of several stacked magnetic blocks can conduct a magnetic flux in a direction perpendicular to the surfaces of the magnetic blocks facing other magnetic blocks, it does not provide any hint about how a magnetic flux can be properly directed in a different direction using stacked magnetic blocks and in particular how to produce a magnetic element made from multiple stacked magnetic blocks which conducts properly multiple orthogonal magnetic fluxes within said magnetic element, produced by several orthogonal coils wound around the magnetic element.

Moreover, the teaching of US2015310976 is far away from a highly compact magnetic power unit with a complex shape structure in particular for a structure for a 3D-power unit.

EP1315178 describes a cubic magnetic core which is nested within a plastic shell made of two parts, each part including four protrusions intended for defining winding channels, but being the magnetic core a regular cube easily producible.

In contrast to the previous cited background the magnetic power unit of this invention is specially designed for high frequency transformers (10 KHz 1 MHz) for switched power electronics where the thermal effects generated by the losses in the core and copper are several orders of magnitude higher than those present in transformers in the field of electricity (50 Hz-60 Hz) such as the majority of the previous cited antecedents.

EP1526606 describe a tri-axial antenna consisting of a planar magnetic core which include eight protrusions which define three orthogonal winding channels wherein three coils are wound. The disclosed antenna has different requirements than a magnetic power unit because the low power typically used on the antennas and the planar shape of the embodiment avoids the overheating of the magnetic core, being not necessary a device for cooling the planar magnetic core. The invention solves the above problems by a special construction of the core and by including associated means for an effective heat dissipation. In this way, it is obtained a highly magnetic power unit up to 50% smaller than the average size of other known magnetic units and with a power density increasing up to 200 W/cm$^3$.

The teaching of this invention provides a magnetic unit that can be implemented in one or more transformers or one or more inductors and/or combinations of magnetically coupled or uncoupled transformers and inductors.

DISCLOSURE OF THE INVENTION

The invention provides a highly compact magnetic power unit particularly adapted to be used as a transformer or inductor in the power industry and especially applicable in the electrical automobile field (mainly for hybrid and electrical vehicles) and comprising a magnetic core that includes a first, a second and a third winding channels respectively arranged around a first, a second and a third crossing axis orthogonal to each other, at least two and in general the three of said winding channels receiving each at least one coil wound around the magnetic core, each coil having at least one turn. The said first, second and third crossing axis define orthogonal planes providing eight octants, each including a protrusion defining a protruding spacer said protruding spacers being spaced to each other by said winding channels. FIG. 17 of cited U.S. Pat. No. 4,210,859 discloses such a core in a single piece.

According to the invention the magnetic core is formed by at least two different partial magnetic cores assembled together by an attachment as a composed core in a layered configuration, including two side partial magnetic cores each including four protruding spacers and the magnetic core includes a through hole or cavity associated to a device for heat dissipation housed inside. The through hole for heat dissipation is perpendicular to one of said first, second or third planes, and extends through at least two partial magnetic cores.

The device for heat dissipation include a not electrically conductive element. In a preferred embodiment it would be a non-metallic thermally conductive element.

According to this invention the non-metallic thermally conductive element is a heat pipe arranged inside (almost all the heat pipe is located within) a hole or inner cavity of the magnetic core and comprising at one of its ends a heat dissipation member.

In an embodiment, the not electrically conductive heat pipe is made of a thermoplastic or ceramic material. It is not significant that such a heat pipe having magnetic, or non-magnetic, paramagnetic or diamagnetic properties. In a preferred embodiment, the heat pipe is arranged coaxial with an axis (A-A) orthogonal to a plane containing at least a turn of said at least one coil, so that the heat pipe extending through the magnetic core capturing the heat generated therein.

In another preferred embodiment the heat pipe is arranged in the cited trough hole or cavity of the magnetic core and communicated with a heat dissipation plate.

As per a preferred embodiment the heat pipe is a hollow pipe filled with a fluid with a low boiling point (as per a technique known in the art).

In a first embodiment, the composed core includes at least one additional central partial magnetic core lacking protruding spacers interposed between said two side partial magnetic cores, i.e. the core is made of three pieces. The partial magnetic cores are assembled together through a mechanical joint attachment using auxiliary elements or alternatively they are assembled together through an adhesive. In an embodiment, the composed core has a general geometric shape selected among a rectangular parallelepiped, cube or sphere.

The magnetic power unit according to the disclosed structured is further surrounded by flux closing magnetic covers. In an embodiment, each flux closing cover is in contact with two or four flux closing covers perpendiculars to it, through perimeter faces. Also in an embodiment, the cited perimeter faces are bevelled. Furthermore, each flux closing cover includes four notches providing winding connection windows when the flux closing covers are in contact with the protruding spacers.

In an embodiment, the core is a rectangular parallelepiped and the flux closing covers are constituted by two or three pairs of flux closing covers, wherein each pair of covers is arranged at two opposite sides of the composed magnetic core, each cover being in contact with four different protruding spacers.

In an alternative embodiment that has not been illustrated (but that will be equivalent to the one in FIG. 16 of U.S. Pat. No. 4,210,859) the composed magnetic core has a general geometric shape of a sphere and the flux closing covers are constituted by at least two opposed spherical caps, and each flux closing cover is in contact with four different protruding spacers.

The composed magnetic core here disclosed and/or the flux closing covers (are made of a material selected among ferrite, ferromagnetic material, or a PBM (polymer-bonded soft magnetic material) injectable material.

The proposed magnetic power unit can be implemented under different embodiments being any of
- a transformer comprising three coils wound in three respective orthogonal axes;
- a transformer comprising two coils wound in two respective orthogonal axes, a third orthogonal axis without coil or including a choke;

a choke comprising three coils wound in three respective orthogonal axes or comprising two coils wound in two respective orthogonal axes;

a transformer including three coils in each of the three orthogonal axes, or any combination of transformer and choke arranged among the three orthogonal axes either magnetically coupled or uncoupled.

Said through hole for heat dissipation in a preferred embodiment is perpendicular to one of said first, second or third planes, and extends through at least two partial magnetic cores. Preferably the heat pipe is arranged coaxial with an axis orthogonal to a plane containing at least a turn of said at least one coil, so that the heat pipe extending through the magnetic core capturing the heat generated therein.

According to an embodiment said heat pipe is a hollow pipe filled with a fluid with a low boiling point, and for example said heat pipe can be made in a thermoplastic or ceramic material having magnetic, or non-magnetic, paramagnetic or diamagnetic properties and said heat dissipation member will comprise a plate.

BRIEF DESCRIPTION OF THE DRAWINGS

Other features of the invention appear from the following detailed description of some embodiments regarding the accompanying drawings, in which.

DETAILED DESCRIPTION OF SOME EMBODIMENTS

Figure 1:
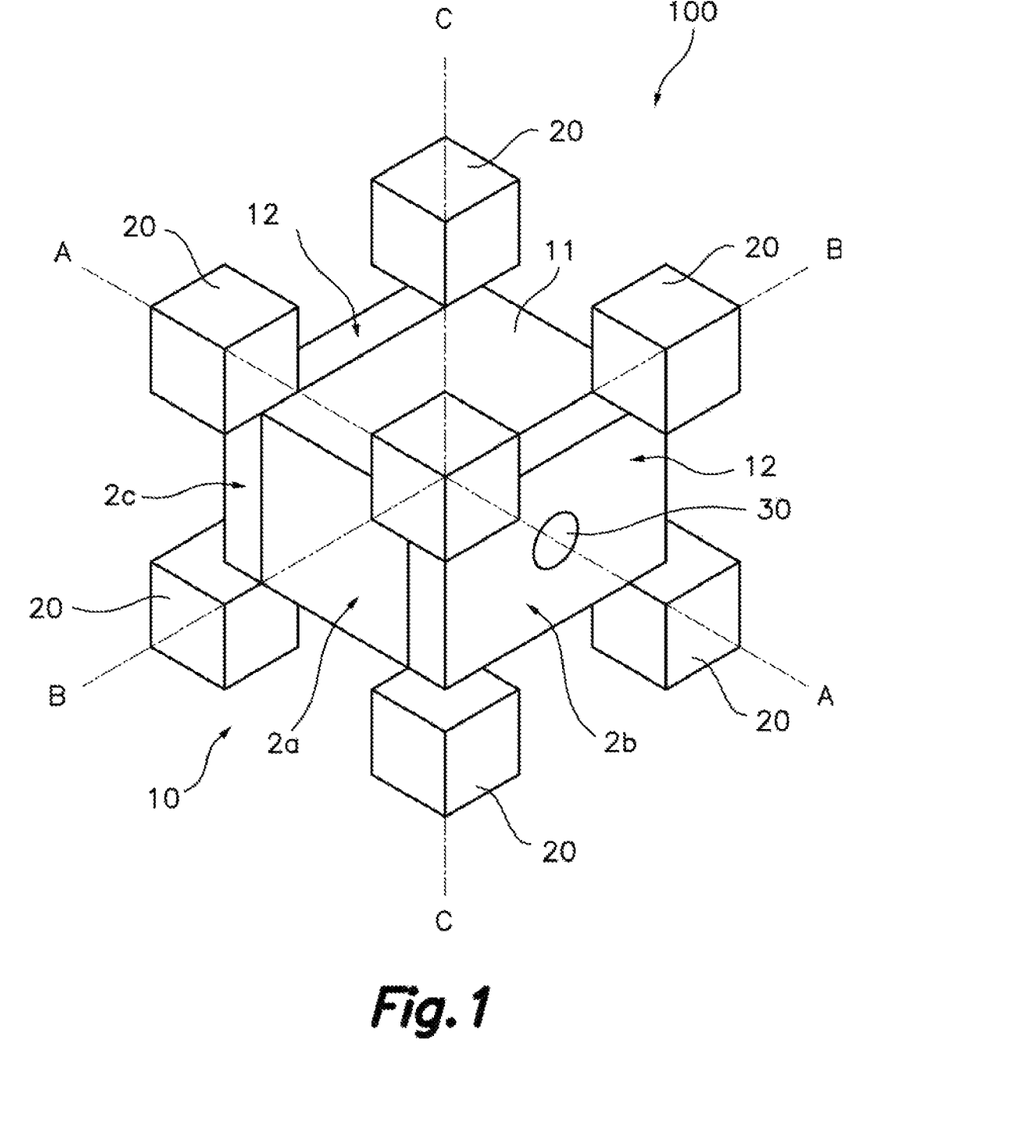
FIG. 1 shows a perspective view of a magnetic power unit according to an embodiment of the present invention.

FIG. 1 shows a magnetic power unit 100 according to a particular embodiment of the present invention.

With respect to FIG. 1, a compact magnetic power unit 100, adapted to be used as a transformer or inductor in the electrical power industry and especially in the field of hybrid and electrical vehicles (involving among other DC/DC power transformer, and converters, DC/AC on board charger, or DC/DC power supply units), is shown. The compact magnetic power unit 100 comprises a magnetic core 10 which enables winding around it one or more orthogonal coils, and a device for heat dissipation 50, also termed cooling structure.

The magnetic power unit 100 comprises a magnetic core 10 including a first, a second and a third winding channel 2a, 2b, 2c, respectively arranged around a first, a second and a third axis A-A, B-B, C-C orthogonal to each other. Each winding channel 2a, 2b, 2c is intended for receiving at least one coil, having at least one turn, wound around the magnetic core 10. Depending on the number and on the arrangement of one or more coils wound around one or more winding channels 2a, 2b, 2c, the magnetic power unit 100 provides different working configurations that will be discussed with greater details in the following description.

The three axes are pairwise perpendicular and define a first, a second and a third plane in which the winding channels are located respectively. For example, the first winding channel 2a, that is arranged around the first axis A-A, is in the first plane that is defined by the other two axis B-B and C-C (i.e. the first plane is the plane orthogonal to the first axis A-A and on which the axes B-B and C-C lie).

The three planes define eight octants, each including a protrusion defining a protruding spacer 20. The eight protruding spacers 20 are spaced to each other by the winding channels 2a, 2b, 2c.

With respect to FIG. 1, the heat pipe 51 is arranged coaxial with the axis A-A orthogonal to a plane containing at least a turn of the coil wound around the winding channel 2a.

In order to allow a simple and reliable production of the magnetic core 10 shown in FIG. 1, the body of the magnetic core is preferably composed of at least two parts 11, 12 assembled together by means of an attachment. In this case, the magnetic core 10 is formed by a plurality of different partial magnetic cores 11, 12 made of a magnetic material selected among ferrite, ferromagnetic material, or a Polymer Bonded Soft Magnetic (PBSM) injectable material. The partial magnetic cores are assembled together by an attachment (for example by an adhesive) forming a composed core 10 in a layered configuration (i.e. the partial magnetic cores are stacked to each other).

With respect to FIG. 1, the magnetic core 10 is preferably formed by three different partial magnetic cores comprising a central partial magnetic core 11 and two side partial magnetic cores 12, wherein each of the two-side partial magnetic cores 12 includes four protruding spacers 20. The central partial magnetic core 11 is interposed between the two-side partial magnetic cores 12 and lacks protruding spacers 20. In this embodiment, the two-side partial magnetic cores 12 have a substantially flat surface configured to be attached to the central partial magnetic core 11 by means of an adhesive (not shown and having a thickness negligible with respect to the dimensions of the magnetic core 10).

Preferably, the composed core 10, when assembled, has a general geometric shape of a rectangular parallelepiped or a cube. In this case, as shown in FIG. 1 each protruding spacer 20 has a general geometric shape substantially cubic shape. An alternative embodiment (not shown) can provide that the composed core 10, when assembled, has a general geometric shape of a sphere. In this last case, each protruding spacer 20 has a general geometric shape comprising an external surface rounded.

Some embodiments can provide that the magnetic core 10 is formed by only two partial magnetic cores each having the protruding spacers 20 (for example two half partial magnetic cores having the same shape and configured to be assembled symmetrically), or by more than three partial magnetic cores. In this last case, the magnetic core 10 is preferably formed by two side partial magnetic cores 12, each including four protruding spacers 20, and a plurality of central partial magnetic cores 11 lacking protruding spacers 20 stacked to each other.

In general, the magnetic core 10 is formed by at least two different partial magnetic cores assembled together by an attachment and comprising two side partial magnetic cores 12, each having four protruding spacers 20. Preferably, the magnetic core 10 includes at least one additional central partial magnetic core 11 lacking protruding spacers 20 interposed between the two-side partial magnetic cores 12.

Figure 2:
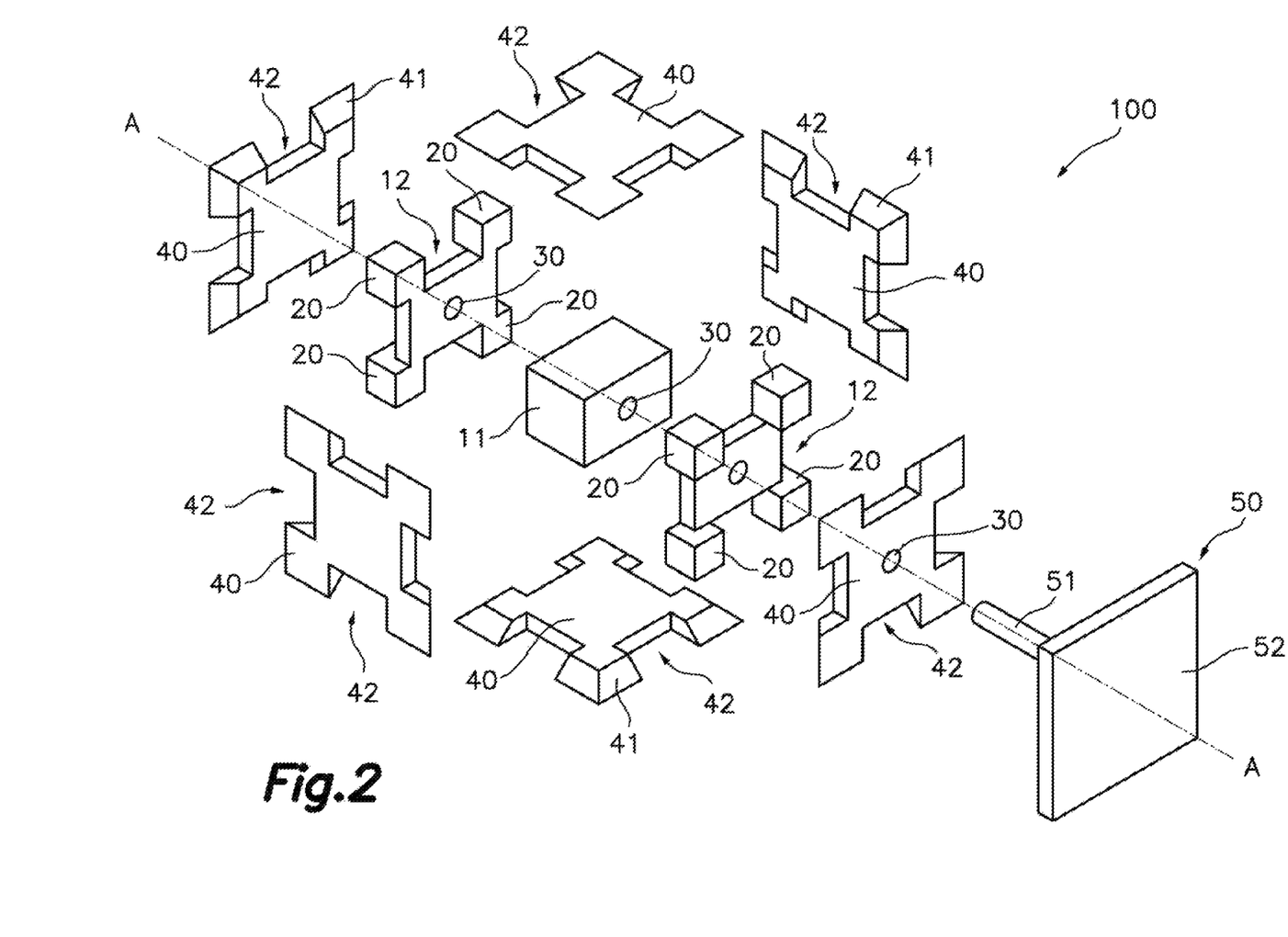
FIG. 2 shows an exploded view of a magnetic power unit according to a particular embodiment of the present invention.

With respect to FIGS. 1 and 2, the magnetic core 10 includes a through hole 30 associated to a device for heat dissipation 50. The through hole 30 is preferably perpendicular to one of the first, second or third planes, more preferably the through hole is substantially coaxial with one of the first, second or third axis. With respect to FIG. 2 the through hole 30 extends through the two-partial side magnetic cores 12 and consequently through the central partial magnetic core 11.

The device for heat dissipation 50 includes a heat dissipation pipe 51 made of a thermal conductor material, preferably made of a not-electrically conductive material. The heat dissipation pipe 51 is arranged in the trough hole 30 and connected to a heat dissipation plate 52, made preferably of the same material of which the dissipation pipe is made. More preferably, the heat dissipation pipe 51 is a hollow pipe filled with a fluid. Some embodiment can provide that the dissipation pipe 51 is made of magnetic or non-magnetic material, or made of paramagnetic or diamagnetic material.

The magnetic core 10 is provided with a through hole 30 for housing almost all a non-metallic thermally conductive element constituting the device for heat dissipation 50. In particular, the non-metallic thermally conductive element is a heat pipe 51 configured to be arranged inside the magnetic core 10. Some embodiments may provide that the magnetic core 10 having a blind hole or in general a hole or inner cavity 30 inside of which a heat pipe 51 can be arranged.

The device for heat dissipation 50 includes a heat dissipation member 52, preferably a heat dissipation plate, connected to the heat pipe 51 at one of its ends. The heat pipe 51 allows capturing the heat generated into the magnetic core 10 for carrying it to the dissipation plate 52. Thus, the compact magnetic power unit 100 provides a better volumetric performance (particularly providing a 3D magnetic flux when three orthogonal windings are involved) and therefore can support density energy until a value of about 200 W/cm$^3$. In this way, the compact magnetic power unit 100 can be realized with reduced dimensions without the risk of overheating that may be occur in some power application (e.g. battery charging in automotive field).

Preferably, the heat pipe 51 is made of a thermoplastic or ceramic material. More preferably, the heat pipe 51 is a hollow pipe filled with a fluid having a low boiling point implementing a technique well known in the art.

Figure 3:
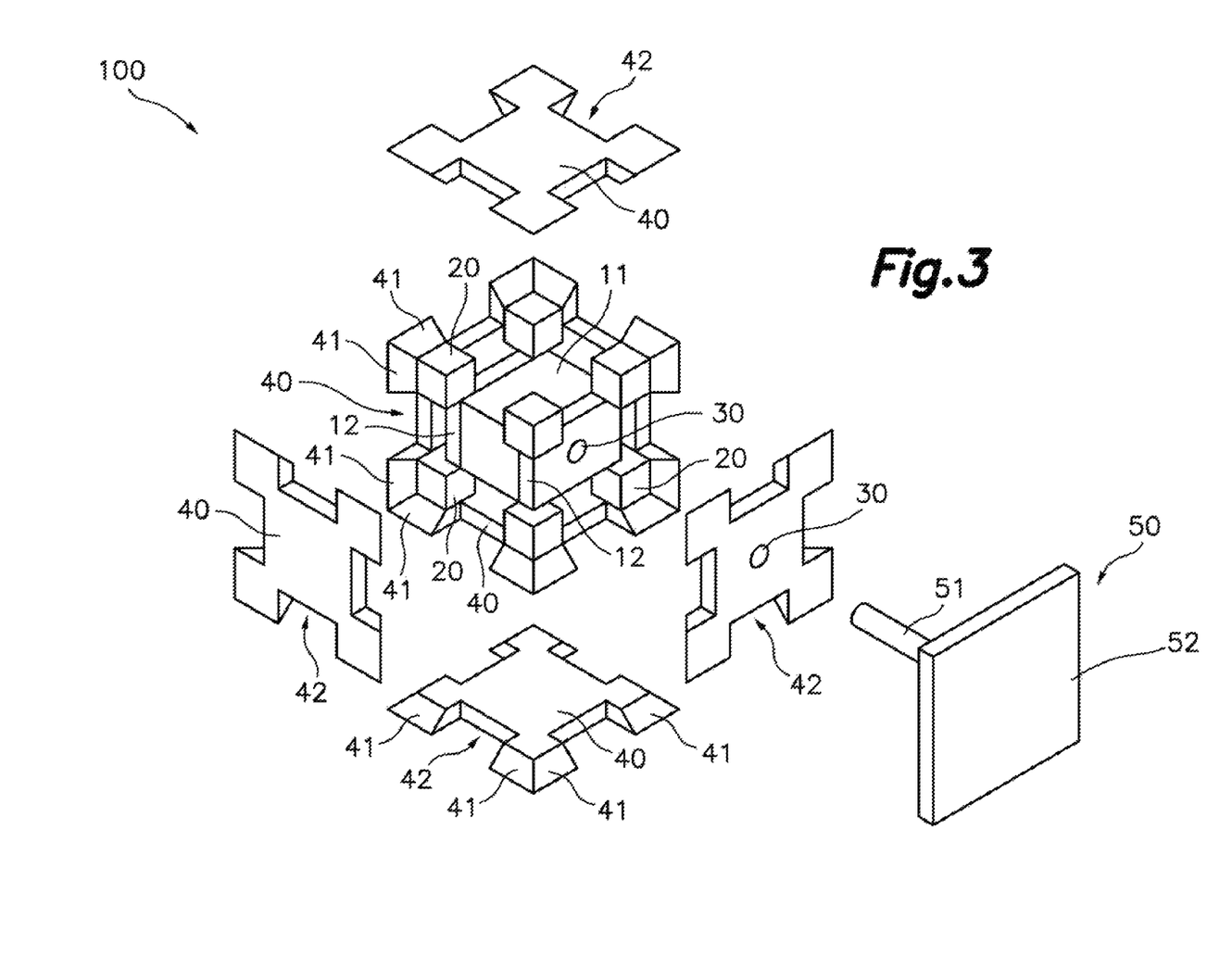
FIG. 3 shows a partial exploded view of the magnetic power unit of FIG. 2.

The compact magnetic power unit 100 comprises at least one coil, wound around the magnetic core 10, not shown in FIG. 1 for a better clarity of the arrangement of hole 30 on the magnetic core 10. Depending on the number and on the arrangement of two or more orthogonal coils (see FIG. 3) wound around the magnetic core 10, the compact magnetic power unit 100 provides different working configurations that will be discussed with greater details in the following description.

As shown in FIG. 2, the magnetic power unit 100 is preferably surrounded by flux closing magnetic covers 40 preferably made of a material selected among ferrite, ferromagnetic material, or a Polymer Bonded Soft Magnetic (PBSM) injectable material, more preferably the same material of which the composed magnetic core 10 is made. In this embodiment, the through hole 30 extends also through the flux closing magnetic covers 40, so that the dissipation pipe 51 can pass through the composed magnetic core 10 and the heat dissipation plate can be arranged externally to the flux closing magnetic covers 40.

In the case of a composed magnetic core 10 having a general geometric shape of a rectangular parallelepiped or a cube, the flux closing covers 40 are preferably constituted by three pairs of flux closing covers 40, arranged at the opposite sides of the magnetic core 10. With respect to FIG. 3, each cover 40 is in contact (for example attached by means of adhesive) with four protruding members 20 and is spaced from the central partial magnetic core 11.

Preferably, each flux closing cover 40 is in contact with other four flux closing covers 40 perpendiculars to it, through four perimeter faces 41. With respect to FIG. 3, the perimeter faces 41 are advantageously bevelled i.e. tapered towards the magnetic core 10 with an inclined coupling surface forming a truncated pyramid having preferably with a surface inclined of about 45°. In this way, in the case of magnetic core 10 having a general geometric shape of a cube (as shown in FIG. 2), covers 40 can be all realized with the same shape.

An alternative embodiment, not shown, can provide that the composed magnetic core 10 has a general geometric shape of a sphere. In this case, the flux closing covers 40 are constituted by at least two opposed spherical caps, and each flux closing cover is in contact (for example attached by means of adhesive) with four different protruding spacers 20.

Figure 4:
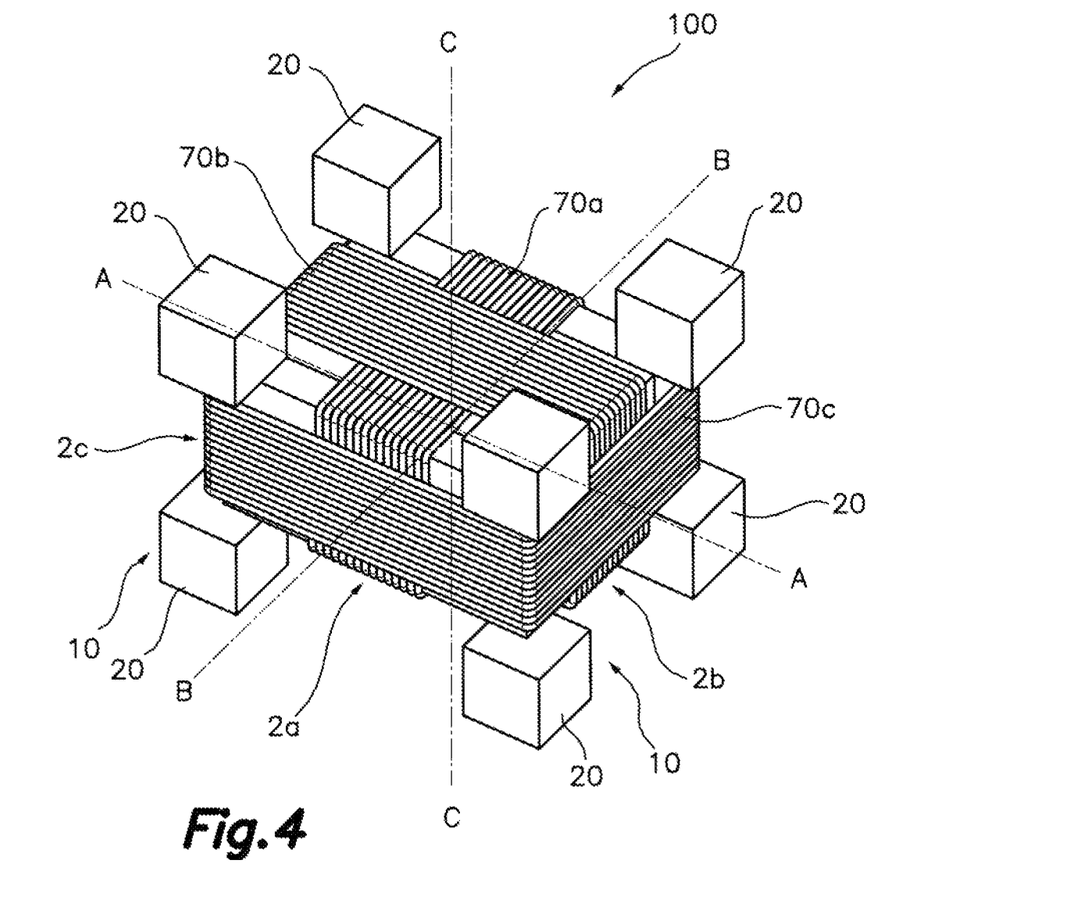
FIG. 4 shows schematically the arrangement of three coils wound around the magnetic power unit of FIG. 1.

FIG. 4 shows three coils 70a, 70b, 70c wound around the three winding channels 2a, 2b, 2c of the composed magnetic core 10 shown in FIG. 1, respectively. In this embodiment, the magnetic power unit 100 provides a transformer comprising three coils 70a, 70b, 70c wound around the three-respective axis A-A, B-B, C-C orthogonal to each other, but as mentioned above, depending on the number and on the arrangement of one or more coils wound around the composed magnetic core 10, the magnetic power unit 100 may provide different device configurations.

In FIG. 4 the through hole 30 is not shown for a better clarity of the arrangement of the three coils 70a, 70b, 70c. It is intended that the turns of the coils 70b and 70c wound around the winding channels 2b and 2c are arranged for avoiding the hole 30 for allowing the passage of the heat dissipation pipe 51.

Some embodiments may provide that the magnetic power unit 100 is a transformer having two coils wound around two respective winding channels (i.e. arranged around two respective axes) and the third winding channel without coil. Furthermore, a third coil wound around the third winding channel may provide a choke for the transformer formed by the two coils wound around the other two winding channels.

Some embodiment may provide that the magnetic power unit 100 is a choke comprising three coils wound in the three-respective winding channel, or comprising two coils wound around two respective winding channels.

Figure 5:
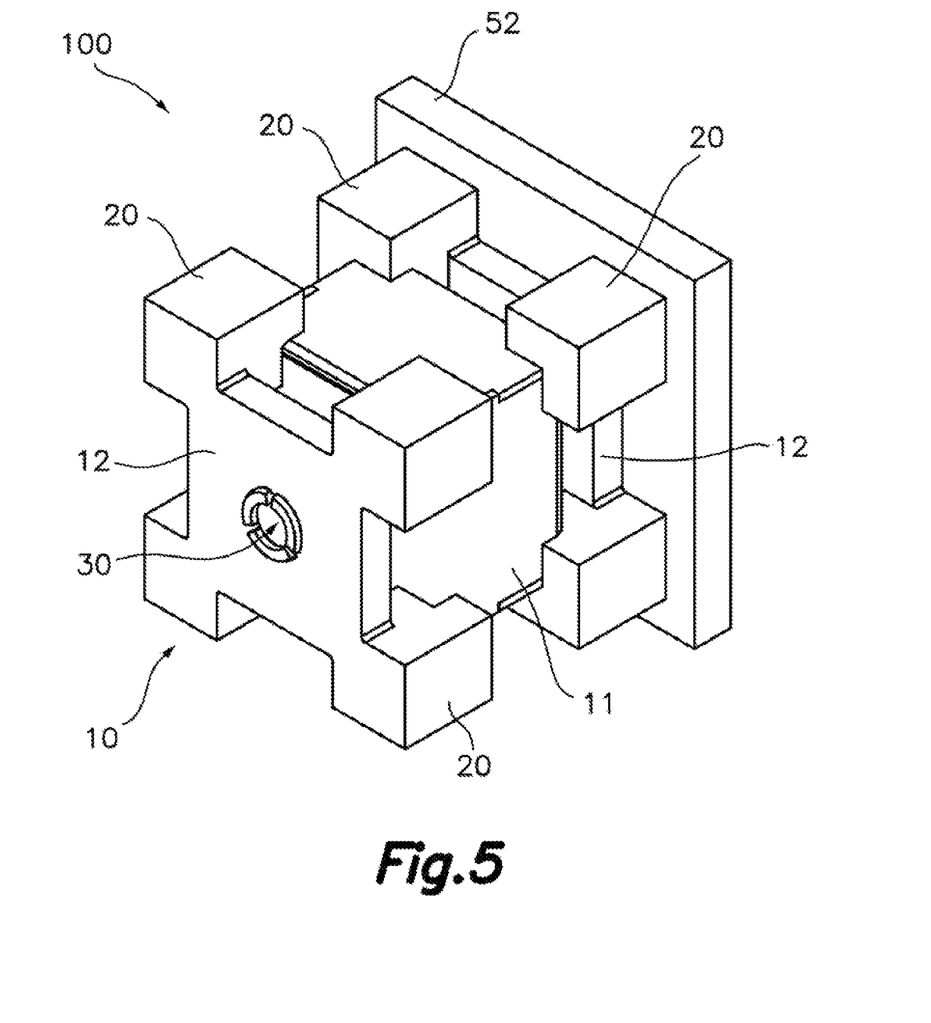
FIG. 5 shows a perspective view of a magnetic power unit according to a particular embodiment of the present invention.

With respect to FIG. 5, another embodiment of the magnetic power unit 100 according to the present invention is shown. In this embodiment, the composed magnetic core 10 is formed by three different partial magnetic cores comprising a central partial magnetic core 11 and two side partial magnetic cores 12, wherein each of the two-side partial magnetic cores 12 includes four protruding spacers 20. The central partial magnetic core 11 is interposed between the two-side partial magnetic cores 12 and lacks protruding spacers 20. Unlike the embodiment shown in FIGS. 1-4, this embodiment provides that the two-side partial magnetic cores 12 have a substantially flat surface configured to be arrange toward the outside of the magnetic core 10 when it is assembled.

Figure 6:
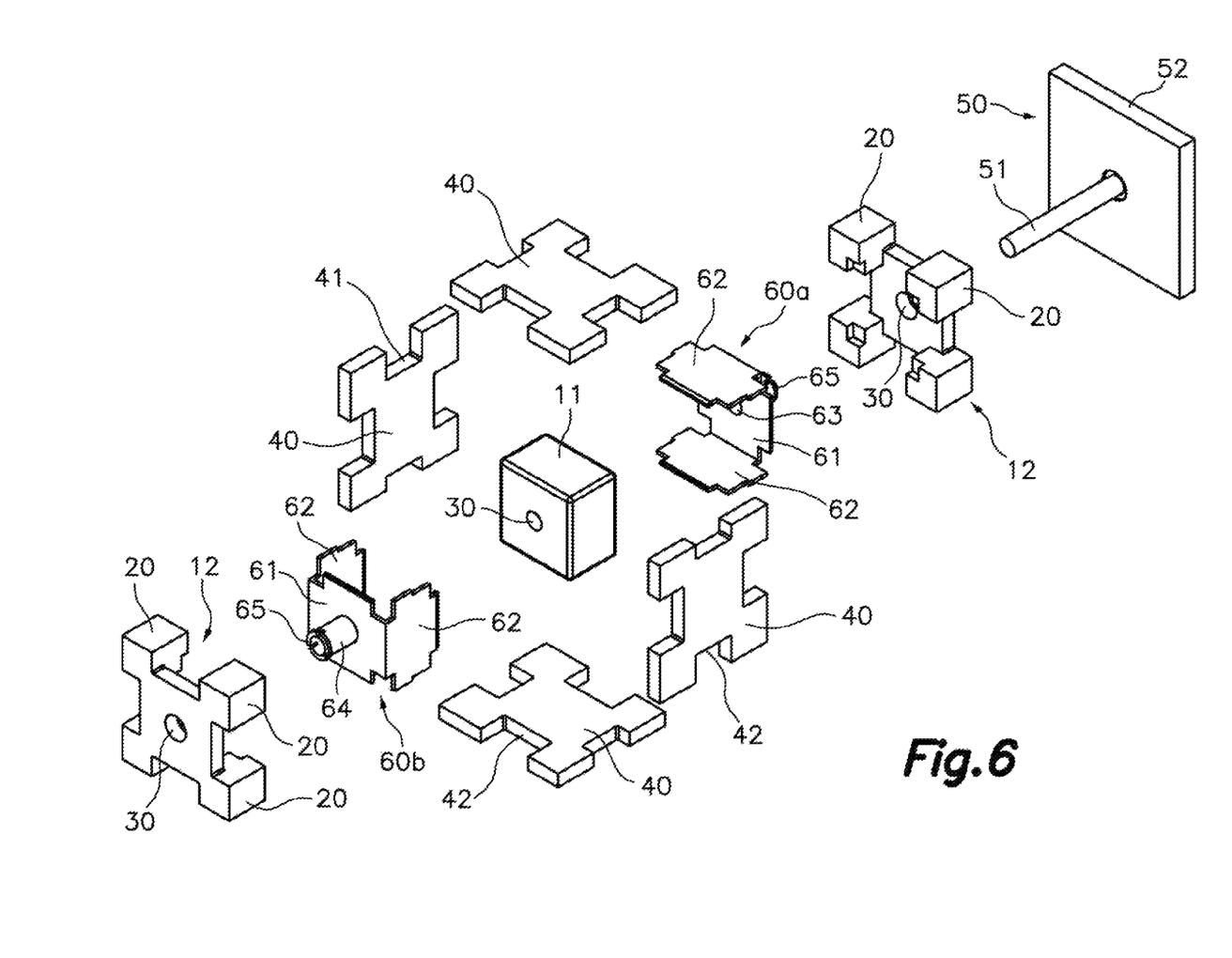
FIG. 6 shows an exploded view of a magnetic power unit according to a particular embodiment of the present invention.
Figure 7:
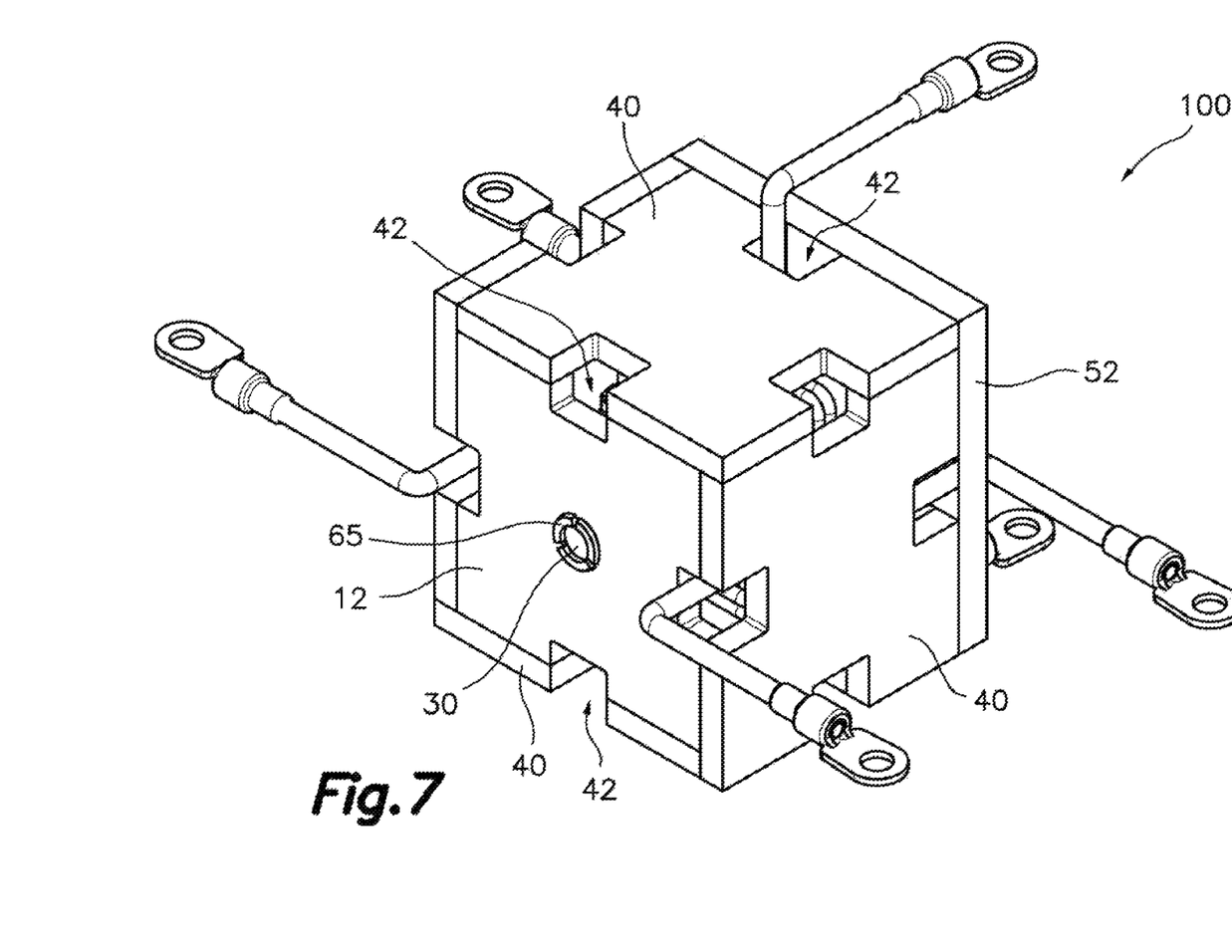
FIG. 7 shows a perspective view of a magnetic power unit according to a particular embodiment of the present invention.

With respect to FIG. 6, the partial magnetic cores 11, 12 are preferably assembled together by means of a mechanical joint attachment using auxiliary elements 60a, 60b comprising preferably a pair of coupling members 60a, 60b each having a substantially C-shaped conformation. Each coupling member 60a, 60b comprises a first wall 61 and two second walls 62 extending from two opposite sides of the first wall 61 towards an orthogonal direction with respect to the first wall. The ends of the two second walls 62 of a coupling member 60a, 60b are configured to snap with the first wall 61 of the other coupling member 60b, 60a.

In this embodiment, the central partial magnetic core 11 is surrounded by six walls of the auxiliary elements 60 (the first walls and second walls of the coupling members 60a, 60b). The first wall 61 of each coupling member 60a, 60b is provided with an opening 63, for passing the heat dissipation pipe 51 through the hole 30, and a sleeve 64 arranged around the opening 63. The end 65 of sleeves 64 are configured to snap with the flat surface of the side partial magnetic cores 12 when the composed magnetic core 10 is assembled.

Preferably, the walls 61, 62 of each coupling member 60a, 60b are provided with a plurality of notches configured to leave open a plurality of passages for allow a direct contact between the central partial magnetic core 10 and the protruding spacers 20 of the side partial magnetic cores 12.

More preferably, the coupling members 60a, 60b are conformed for providing eight passages to allow a direct contact between each of the eight corners of the central partial magnetic core 10 with each of the protruding spacers 20 of the side partial magnetic cores 12, respectively. In this last embodiment, each protruding spacer 20 is preferably provided with a seat having a shape complementary to the respective corner.

As shown in FIG. 6, the magnetic power unit 100 is preferably surrounded by flux closing magnetic covers 40 preferably made of a material selected among ferrite, ferromagnetic material, or a Polymer Bonded Soft Magnetic (PBSM) injectable material, more preferably the same material of which the composed magnetic core 10 is made.

In this embodiment, the flux closing covers 40 are preferably constituted by two pairs of flux closing covers 40, arranged at the opposite sides of the magnetic core 10 and orthogonally with respect to the side partial magnetic covers 12. Each cover 40 is in contact (for example attached by means of adhesive) with four protruding members 20 and is spaced from the central partial magnetic core 11.

With respect to FIGS. 2, 3, 6 and 7, each flux closing cover 40 includes four notches 42, each notch 42 for providing winding connection windows when flux closing covers 40 are in contact with the protruding spacers 20.

The invention claimed is:

1. A compact magnetic power unit for a power electronics system comprising a magnetic core including a first, a second and a third winding channels respectively arranged around a first, a second and a third crossing axes orthogonal to each other, at least two of the first, second and third winding channels receiving each at least one coil wound around the magnetic core, each coil having at least one turn,
   the first, second and third crossing axes define orthogonal planes providing eight octants, each including a protrusion defining one protruding spacer, each protruding spacer being spaced from protruding spacers placed in other octants by the first, second and third winding channels,
   the magnetic core is a composed core including one central partial magnetic core, devoid of protruding spacers, interposed between two-side partial magnetic cores, each side partial magnetic core including four of the protruding spacers, the central and side partial magnetic cores being assembled in a layered configuration,
   the magnetic core includes a through hole that extends across the central and the two-side partial magnetic cores, the through hole being associated to a device for heat dissipation, which includes a thermally conductive and non-electrically conductive heat pipe arranged in the through hole and thermally connected with a heat dissipation plate.

2. The compact magnetic power unit according to claim 1, wherein the magnetic core has a general geometric shape selected among a rectangular parallelepiped, cube, or sphere.

3. The compact magnetic power unit according to claim 1, wherein the partial magnetic cores are assembled together through a mechanical joint attachment using auxiliary elements or through an adhesive.

4. The compact magnetic power unit according to claim 1, wherein the magnetic power unit is surrounded by flux closing magnetic covers, each flux closing cover being in close contact with adjacent flux closing covers through respective contact surfaces, defined on a perimeter region of each flux closing cover, the contact surfaces of the different flux closing covers being facing each other and in close contact with each other.

5. The compact magnetic power unit according to claim 4, wherein the magnetic core has a general geometric shape selected among:
   a rectangular parallelepiped shape and the flux closing covers are two or three pairs of flux closing covers, wherein each pair of flux closing covers is arranged at two opposite sides of the composed magnetic core, each flux closing cover is in contact with four of the protruding spacers; or
   a sphere shape and the flux closing covers are at least two opposed spherical caps, and each flux closing cover is in contact with four of the protruding spacers.

6. The compact magnetic power unit according to claim 4, wherein each flux closing cover is perpendicular to, and in contact with, two or four flux closing covers.

7. The compact magnetic power unit according to claim 6 wherein the contact surfaces of each flux closing cover, in close contact with contact surfaces of adjacent flux closing covers, are bevelled perimeter faces of the flux closing cover.

8. The compact magnetic power unit according to claim 6 wherein each flux closing cover includes four notches, for providing winding connection windows when the flux closing cover are in contact with the protruding spacers.

9. The compact magnetic power unit according to claim 1 being any of:
   a transformer comprising three coils wound in three respective axes;
   a transformer comprising two coils wound in two respective axes, a third axis without coil or including a choke;
   a choke comprising three coils wound in three respective axis or comprising two coils wound in two respective axes;
   a transformer including three coils in each of the three axes, or any combination of transformer and choke arranged among the three axes.

10. The compact magnetic power unit according to claim 4 wherein the composed magnetic core and/or the flux closing covers are made of a material selected among ferrite, ferromagnetic material, or a PBM injectable material.

11. The compact magnetic power unit according to claim 1, wherein the through hole for heat dissipation is perpendicular to one of the first, second or third planes, and extends through at least two partial magnetic cores.

12. The compact magnetic power unit according to claim 1, wherein the heat pipe is arranged coaxial with an axis orthogonal to a plane containing at least a turn of the at least one coil, so that the heat pipe extending through the magnetic core capturing the heat generated therein.

13. The compact magnetic power unit according to claim 1, wherein the heat pipe is a hollow pipe filled with a fluid with a low boiling point.

14. The compact magnetic power unit according to claim 13, wherein the heat pipe is made in a thermoplastic or ceramic material having magnetic, or non-magnetic, paramagnetic or diamagnetic properties and the heat dissipation member comprising a plate.

15. The compact magnetic power unit according to claim 1 wherein the compact magnetic power unit is integrated in a switched power electronics system where high frequency magnetic fields are used between 10 KHz and 1 MHZ.

16. The compact magnetic power unit according to claim 15, wherein the magnetic power unit is a high frequency transformer.

\* \* \* \* \*